(12) United States Patent
Tokunaga et al.

(10) Patent No.: US 9,169,931 B2
(45) Date of Patent: Oct. 27, 2015

(54) SLIDING COMPONENT

(75) Inventors: Yuichiro Tokunaga, Minato-Ku (JP); Yuji Yamamoto, Fukuoka (JP)

(73) Assignee: Eagle Industry Co., Ltd., Minato-Ku (JP)

( * ) Notice: Subject to any disclaimer, the term of this patent is extended or adjusted under 35 U.S.C. 154(b) by 371 days.

(21) Appl. No.: 12/876,516

(22) Filed: Sep. 7, 2010

(65) Prior Publication Data

US 2011/0215531 A1 Sep. 8, 2011

(30) Foreign Application Priority Data

Mar. 4, 2010 (JP) ................................ 2010-048035

(51) Int. Cl.
 *F16J 15/34* (2006.01)
(52) U.S. Cl.
 CPC .............. *F16J 15/34* (2013.01); *F16J 15/3412* (2013.01)
(58) Field of Classification Search
 USPC ................................................. 277/399–400
 See application file for complete search history.

(56) References Cited

U.S. PATENT DOCUMENTS

| | | | | |
|---|---|---|---|---|
| 5,447,316 A | * | 9/1995 | Matsui | 277/400 |
| 5,492,341 A | * | 2/1996 | Pecht et al. | 277/400 |
| 5,496,047 A | | 3/1996 | Goldswain et al. | |
| 5,529,317 A | * | 6/1996 | Muller | 277/400 |
| 5,834,094 A | * | 11/1998 | Etsion et al. | 428/156 |
| 5,952,080 A | * | 9/1999 | Etsion et al. | 428/156 |
| 6,002,100 A | * | 12/1999 | Etsion | 219/121.71 |
| 6,046,630 A | * | 4/2000 | Kim | 329/304 |
| 6,341,782 B1 | * | 1/2002 | Etsion | 277/399 |
| 6,902,168 B2 | * | 6/2005 | Tejima | 277/399 |
| 7,044,470 B2 | * | 5/2006 | Zheng | 277/400 |
| 7,241,049 B2 | * | 7/2007 | Lin et al. | 384/95 |
| 7,780,399 B1 | * | 8/2010 | Garrison | 415/1 |
| 2003/0178781 A1 | * | 9/2003 | Tejima | 277/399 |
| 2003/0189294 A1 | * | 10/2003 | Tejima | 277/399 |
| 2004/0080112 A1 | * | 4/2004 | Tejima | 277/306 |
| 2006/0120640 A1 | * | 6/2006 | Lin et al. | 384/92 |

FOREIGN PATENT DOCUMENTS

| | | |
|---|---|---|
| JP | 02-136863 | 11/1990 |
| JP | 02-136864 | 11/1990 |
| JP | 06-081964 | 3/1994 |

(Continued)

OTHER PUBLICATIONS

D.B. Hamilton, et al., "*A Theory of Lubrication by Micro-Irregularities*," Journal of Basic Engineering, Transactions at the ASME, Paper No. 65-Lub-11 (1965), pp. 1-9.

(Continued)

*Primary Examiner* — Vishal Patel
(74) *Attorney, Agent, or Firm* — Burr & Brown, PLLC

(57) ABSTRACT

An aspect of the invention provides a sliding component in which a phase made of liquid and a phase made of gas, which are formed in a sliding portion, are stabilized. A sliding component constitutes one of two sliding components that rotate relatively, and planar end faces of the two sliding component slide on each other. In the sliding component, a plurality of dimples is arrayed in a sliding surface such that, in a phase made of liquid and a phase made of gas, the phase made of the gas is positioned when the two components rotate relatively. The phase made of the liquid and the phase made of the gas are formed so as to revolve about rotation centers of sliding portions of the two components.

7 Claims, 16 Drawing Sheets

(56) References Cited

FOREIGN PATENT DOCUMENTS

| | | |
|---|---|---|
| JP | 3026252 B2 | 1/2000 |
| JP | 2004-162907 | 6/2004 |

OTHER PUBLICATIONS

Japanese Office Action (With English Translation), Japanese Patent Application No. 2010-048035, dated Aug. 30, 2013 (2 pages).

* cited by examiner

Fig. 9

SPECIFICATIONS OF END FACE SHAPE

| SPECIFICATIONS | END FACE ON FIXED SIDE | END FACE ON ROTAION SIDE |
|---|---|---|
| MATERIAL | SiC | OPTICAL GLASS |
| INNER DIAMETER | φ17.4mm | — |
| OUTER DIAMETER | φ21.0mm | φ30.0mm |
| THICKNESS | — | 5.0mm |
| SURFACE WIDTH | 1.8mm | — |

TEST CONDITIONS

| NUMBER OF REVOLUTIONS | 500rpm |
|---|---|
| SEALED FLUID | ETHYLENE GLYCOL WATER SOLUTION |
| SEALED PRESSURE | 0.1MPa (GAGE PRESSURE) |
| TEST TEMPERATURE | ORDINARY TEMPERATURE (25℃) |
| MOUNTING SURFACE PRESSURE | 0.25MPa |

SPECIFICATIONS OF END FACE SHAPE

| SPECIFICATIONS | END FACE ON FIXED SIDE | END FACE ON ROTAION SIDE |
|---|---|---|
| MATERIAL | SiC | SiC |
| INNER DIAMETER | φ17.4mm | φ16.0mm |
| OUTER DIAMETER | φ21.0mm | φ21.8mm |
| SURFACE WIDTH | 1.8mm | 2.9mm |

TEST CONDITIONS

| NUMBER OF REVOLUTIONS | 5000rpm |
|---|---|
| SEALED FLUID | ETHYLENE GLYCOL WATER SOLUTION |
| SEALED PRESSURE | 0.1MPa (GAGE PRESSURE) |
| TEST TEMPERATURE | ORDINARY TEMPERATURE (25℃) |
| MOUNTING SURFACE PRESSURE | 0.25MPa |

| SAMPLE | PARAMETER ||||| RESULT ||
| --- | --- | --- | --- | --- | --- | --- | --- |
| | 1<br>Dr×n/W<br>- | 2<br>S/Dr<br>- | 3<br>T/Dr<br>- | 4<br>E<br>° | 5<br>P<br>μm | LEAKAGE AMOUNT<br>mg/h | ABRASION AMOUNT<br>μm |
| 1 | 0.1 | 2.5 | 1 | 90 | 50 | 31.6(NG) | 0.8(NG) |
| 2 | 0.15 | 2.5 | 1 | 90 | 50 | 1.4 | 0.1 |
| 3 | 0.5 | 2.5 | 1 | 90 | 50 | 3.6 | 0.3 |
| 4 | 0.5 | 2.5 | 1 | 130 | 5 | 5 | 0.4 |
| 5 | 0.5 | 2.5 | 1 | 150 | 50 | 25.5(NG) | 0.5 |
| 6 | 0.7 | 2.5 | 1 | 90 | 5 | 12.2 | 1.2(NG) |
| 7 | 0.5 | 2.5 | 1 | 90 | 50 | 12 | 0 |
| 8 | 0.25 | 15 | 0.5 | 90 | 50 | 27.3(NG) | 0.3 |
| 9 | 0.25 | 10 | 0.5 | 90 | 50 | 10.8 | 0 |
| 10 | 0.25 | 1 | 0.3 | 90 | 50 | 26.9(NG) | 0.2 |
| 11 | 0.25 | 1 | 0.5 | 90 | 50 | 16.4 | 0.5 |
| 12 | PLANE SURFACE |||||  28.5(NG) | 1.1(NG) |

Fig. 20

SLIDING COMPONENT

BACKGROUND OF THE INVENTION

1. Field of the Invention

The present invention relates to a sliding component that is used in, for example, a mechanical seal.

2. Description of the Related Art

A sealing device (for example, mechanical seal) including relatively rotating two components in which planar end faces slide on each other has been known as a sealing device that prevents (suppresses) leakage of sealed fluid. In such sealing devices, in order to maintain a good sealed state for long periods, it is necessary that a fluid lubricating film be formed between sliding surfaces of the two components by the sealed fluid. Therefore, abrasion or roughened surface can be prevented (suppressed). In order to maintain a sealing property for long periods, it is necessary to balance contradictory conditions of "sealing" and "lubrication".

Recently, for the purpose of environmental measures, a demand for low friction arises in order that a mechanical loss is reduced while the leakage of the sealed fluid is prevented.

When the sliding surfaces of the two components are formed with a smooth surface like a general mechanical seal, it has been known that not only a film of the sealed fluid but also a phase by cavitation generated in the fluid are formed between the sliding surfaces (see Hamilton, Walowit, Allen: A. S. M. E. Paper No. 65-Lub-11 (1965)). That is, a phase (hereinafter referred to as liquid phase) made of the liquid (sealed fluid) and a phase (hereinafter referred to as gas phase) made of gas are formed between the sliding surfaces.

It is confirmed that the phases formed between the sliding surfaces express an extremely unstable behavior even if the relative rotation of the two components is steady. The cavitation that is of a factor of forming the gas phase is generated by minute irregularity of the sliding surface. The cavitation is generated in a random position, and the behavior of the cavitation is unstable after the generation. Therefore, the behavior of the liquid phase and the gas phase become unstable. The unstable behavior of the two phases will be described with reference to FIGS. 21A to 21D. FIGS. 21A to 21D illustrate an example of the behavior of the liquid phase and the gas phase that are produced between the sliding surfaces of the two components that rotate relatively at a constant speed.

In FIGS. 21A to 21D, the meshed portions indicate liquid phases, and the portions that are not meshed indicate gas phases. In FIGS. 21A to 21D illustrate different timing states while the two components rotate relatively at a constant speed (one of the two components rotate while the other stands still).

As can be seen from FIGS. 21A to 21D, the mixed state of the liquid phase and the gas phase changes complicated with time. It is also confirmed an increase in friction coefficient in which the sliding surfaces comes into direct contact with each other while the whole sliding surface is instantaneously covered with the gas phase. The phenomenon is attributed to the fact that the sliding surface formed with the smooth surface does not have a mechanism or a structure that retains and stabilizes the film (phase) made of the liquid between the sliding surfaces.

There has been also known a sliding component in which micro holes or dimples are made on the sliding surface to improve lubricating property (see Japanese Patent No. 3026252).

FIG. 22 is a plan view partially illustrating a sliding surface of a sliding component according to a conventional example. As illustrated in FIG. 22, a plurality of dimples 501 is provided in a sliding surface of a sliding component 500. A hydrodynamic lubricating film (film formed with the sealed fluid) is formed according to the shapes and array of the dimples 501. A lubricating liquid (sealed fluid) is supplied from the dimple 501. Conventionally, the film of the lubricating liquid (sealed fluid) is stably formed in the sliding surface by providing the dimples 501 in the sliding surface of the sliding component 500, thereby aiming to improve the suppressing effect of the sliding abrasion.

However, the sealing performance is degraded when the sealed fluid is supplied to the sliding surface by the micro holes such as dimples to encourage film formation of the sealed fluid. Therefore, there is a risk of losing the original function of the seal. In order to maintain the sealing performance, it is necessary to block out a leakage direction, that is, a flow of the sealed fluid in a radial direction of the sliding surface. However, the conventional sliding component does not include the mechanism or structure that blocks out the flow of the sealed fluid in the radial direction.

SUMMARY OF THE INVENTION

An object of the invention is to provide a sliding component in which the phase made of the liquid and the phase made of the gas, formed in the sliding portion, are stabilized.

The invention adopts the following means to solve the problem.

According to an aspect of the invention, a sliding component that constitutes one of two components rotating relatively, planar end faces of the two components sliding on each other, wherein a plurality of dimples is arrayed in a sliding surface such that, in a phase made of liquid (hereinafter referred to as liquid phase) and a phase made of gas (hereinafter referred to as gas phase), the phase made of the gas is positioned when the two components rotate relatively, the phase made of the liquid and the phase made of the gas being formed so as to revolve about rotation centers of sliding portions of the two components.

According to the aspect of the invention, in a phase made of liquid and a phase made of gas, which are formed so as to revolve about rotation centers of sliding portions of the two components, the phase made of the gas is positioned in the sliding portions of the two components. Therefore, the positioned gas phase exerts a function of blocking the liquid phase movement (movement in which the liquid passes through the positioned gas phase). Accordingly, the liquid phase can be prevented from being eliminated in the sliding portion. The film (lubricating film) is stably formed in the sliding surface with the liquid to suppress the sliding abrasion. When the sliding component is a component such as a mechanical seal constituting the sealing device, the leakage of the sealed fluid can be suppressed.

In the plurality of dimples, an edge portion provided along an opening end edge of each dimple may be formed into a shape having an acute angle, and the dimples may be arrayed such that, in two dimples adjacent to each other in the rotation direction, during sliding, a dimple located on a downstream side in the rotation direction exists within a range of a gaseous film formed along the edge portion of the dimple on an upstream side in the rotation direction.

Accordingly, the gaseous film is formed so as to connect the dimples. Therefore, in the liquid phase and gas phase which are formed so as to revolve about rotation centers of sliding portions of the two components, the gas phase is positioned in the sliding portions of the two components.

The plurality of dimples may be arrayed on a virtual circumference having a center point at the rotation centers of the two components.

Therefore, the gas phase is positioned in the annular manner. Accordingly, the positioned annular gas phase exerts the function of blocking radial movement of the liquid.

The plurality of dimples may be arrayed on each of a plurality of virtual circumferences having center points at the rotation centers of the two components, the virtual circumferences having different diameters.

Therefore, the plurality of liquid phases and the plurality of gas phases are concentrically formed. Accordingly, the film can stably be formed in the sliding surface with the liquid, and the radial movement of the liquid can be suppressed.

The plurality of dimples may be arrayed on a virtual spiral that revolves in rotation directions of the two components.

Therefore, the gas phase is formed into the spiral shape, and the liquid phase is formed along the formed gas phase. The pumping action in which the liquid flows along the spiral shape can be generated according to the rotation direction. Accordingly, when the sliding component is a component such as a mechanical seal constituting the sealing device, the pumping action is generated such that the sealed fluid is returned to the sealed region side, which allows the sealing performance to be further enhanced.

In an inner circumference side and an outer circumference side of the sliding surface, the plurality of dimples may be provided on the side opposite to the side filled with the liquid and within a range of ⅔ of a radial width of the sliding surface.

That is, a load supporting region is reduced when the plurality of dimples having the functions of retaining the gas phase are provided. Therefore, in the sliding surface, the region where the plurality of dimples is arrayed is provided on the side opposite to the side filled with the liquid and within the range of ⅔ of the radial width of the sliding surface, which allows the load supporting region to be secured.

The above-described configurations may be combined as much as possible.

As described above, according to the invention, the phase made of the liquid and the phase made of the gas, which are formed in the sliding portion, can be stabilized.

The above and other objects, features and advantages of the present invention will become more readily apparent to those skilled in the art from the following detailed description of a preferred embodiment of the present invention taken in conjunction with the accompanying drawings.

BRIEF DESCRIPTION OF THE DRAWINGS

FIG. 9 is a table illustrating contents of an evaluation test;

FIG. 20 is a table illustrating results of a test performed using samples in which dimensions (parameters) of each portion are changed;

DETAILED DESCRIPTION OF THE INVENTION

Embodiments of the invention will be described below with reference to the drawings. However, unless otherwise noted, the scope of the invention is not limited to dimensions, materials, shapes, and a relative disposition of constituents described in the embodiments.

First Embodiment

A sliding component according to a first embodiment of the invention will be described with reference to FIGS. 1 to 12. In the first embodiment, the case in which a component constituting a mechanical seal is the sliding component will be described by way of example.

<Mechanical Seal>

Figure 1:
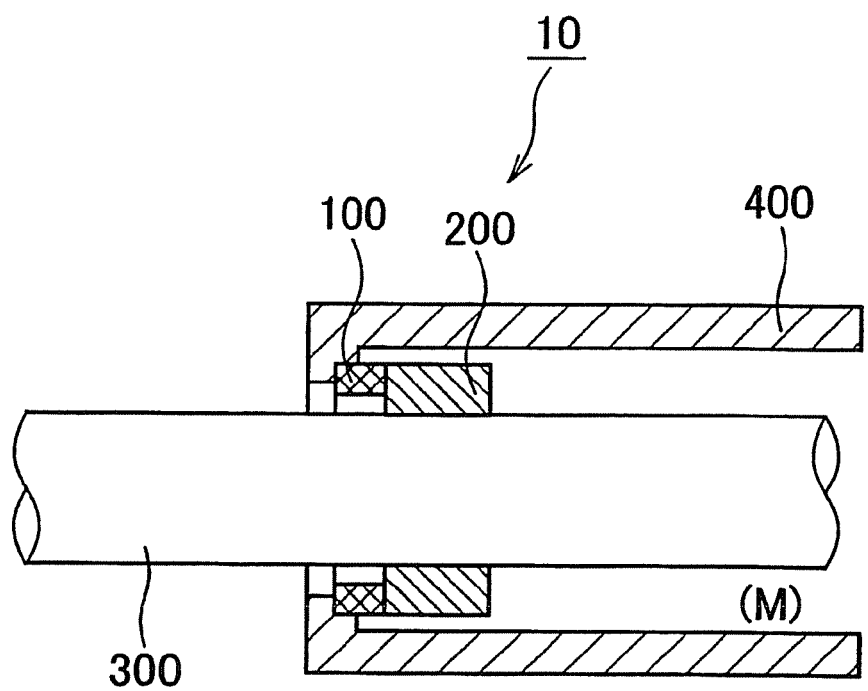
FIG. 1 is a schematically sectional view illustrating a usage state of a mechanical seal according to an embodiment of the invention.

The mechanical seal to which the sliding component of the first embodiment is applied will be described with reference to FIG. 1. FIG. 1 is a schematically sectional view illustrating a usage state of a mechanical seal according to an embodiment of the invention.

A mechanical seal 10 is provided to prevent leakage of a liquid (sealed fluid) M sealed in an annular gap between a rotation shaft 300 and a housing 400 in which the rotation shaft 300 is inserted. The mechanical seal 10 includes an annular first sliding component 100 that is fixed onto an inner circumference side of the housing 400 and an annular second sliding component 200 that is fixed to the rotation shaft 300. Because the second sliding component 200 also rotates with the rotation of the rotation shaft 300, the first sliding component 100 and the second sliding component 200 rotate relatively. A planar end face on the right of FIG. 1 in the first sliding component 100 and an end face on the left in FIG. 1 in the second sliding component 200 are configured to slide on each other. The leakage of the sealed liquid M is prevented by the sliding portions of the end faces.

As described in the background art, a phase (hereinafter referred to as liquid phase) made of the liquid (sealed fluid) and a phase (hereinafter referred to as gas phase) made of the gas are formed between the sliding surface of the first sliding component 100 and the sliding surface of the second sliding component 200. This is because the cavitation is generated in the liquid during the sliding. For example, the cavitation is formed with a bubble mainly made of atmospheric gas, gas separated from the liquid, and vapor of the liquid.

The mechanical seal 10 of the first example is configured such that the behavior of the liquid phase and the gas phase, which are formed between the sliding surface of the first sliding component 100 and the sliding surface of the second sliding component 200, are stabilized (radial movement is controlled). This point will be described in detail below.

<First Sliding Component>

Figure 2:
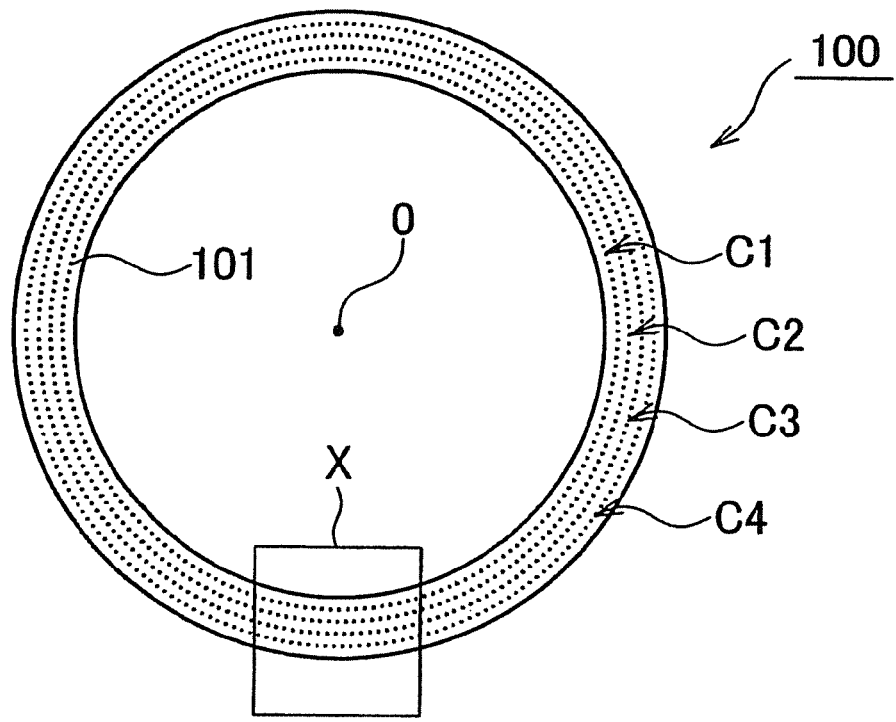
FIG. 2 is a plan view of a sliding component according to a first embodiment of the invention.
Figure 3:
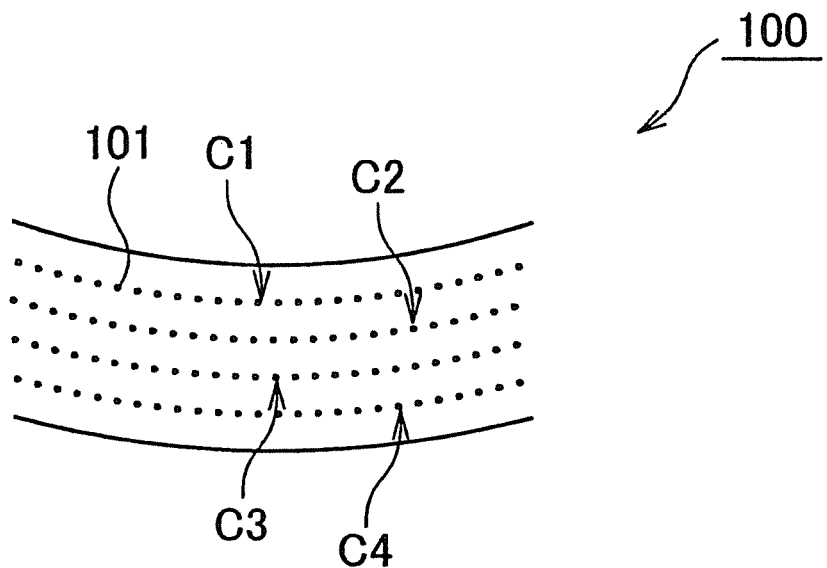
FIG. 3 is a partially enlarged view of the sliding component according to the first embodiment of the invention.

A configuration of the first sliding component 100 will be described with reference to FIGS. 2 and 3. FIG. 2 is a plan view of the sliding component (first sliding component) of the first embodiment. FIG. 3 is a partially enlarged view of the sliding component (first sliding component) of the first embodiment. FIG. 3 is an enlarged view of an X portion in FIG. 2.

A plurality of dimples 101 is provided in the sliding surface of the first sliding component 100. For example, the dimples 101 can easily be formed with a commercially available laser processing machine. There is no particular limitation to the material for the first sliding component 100. However, a material suitable for the laser processing is used when the dimples 101 are formed by the laser processing. The method for processing the dimples 101 is not limited to the laser processing, but a photo-etching treatment, sandblasting, and the like may be adopted.

In the first embodiment, the dimples 101 are arrayed on a plurality of virtual circumferences C1, C2, C3, and C4 whose diameters are different from one another. The virtual circumferences C1, C2, C3, and C4 have a center point O located at a relative rotation center of the first sliding component 100 and the second sliding component 200. The relative rotation center of the first sliding component 100 and the second sliding component 200 is located on a central shaft line of the rotation shaft 300 that is of the rotation center of the second sliding component 200. The dimples 101 are disposed at equal intervals on each virtual circumference.

Under specific conditions, the behavior of the liquid phase and the gas phase, formed between the sliding surface of the first sliding component 100 and the sliding surface of the second sliding component 200, can be stabilized by the dimples 101 arrayed in the above-described manner. That is, the gas phase is positioned, and the positioned gas phase exerts a function of blocking the radial movement of the liquid phase.

The mechanism in which the function is exerted by the dimples 101 will be described in detail below. There is no particular limitation to an outer shape or a size of the dimple 101 as long as the gas phase can stably be positioned. Examples of the shape of the dimple 101 include a circle, an ellipsoid, and a rectangular shape.

However, it is necessary that the dimple 101 be formed into a shape having an acute angle in an edge portion provided along the opening end edge thereof. This is described in detail in the following mechanism. There is no particular limitation to a depth of the dimple 101 as long as the acute angle can be maintained in the edge portion. However, an internal volume of the dimple 101 increases when the dimple 101 is excessively deep, thereby increasing an amount of gas necessary to stably form the gas phase. Therefore, the dimple 101 desirably has the proper depth.

A disposition in a rotation direction of the dimples 101 (interval between the dimples 101 adjacent to each other in the rotation direction) is described in the following mechanism.

<Mechanism>

Figure 4:
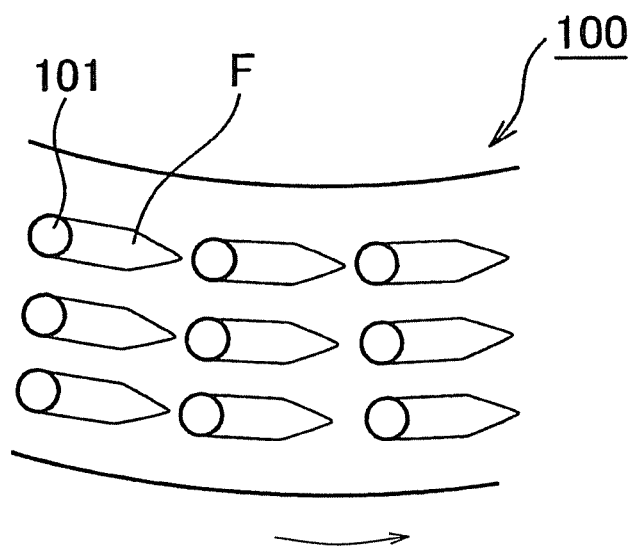
FIG. 4 is a plan view schematically illustrating a state of a sliding surface in the sliding component according to the first embodiment of the invention.
Figure 5:
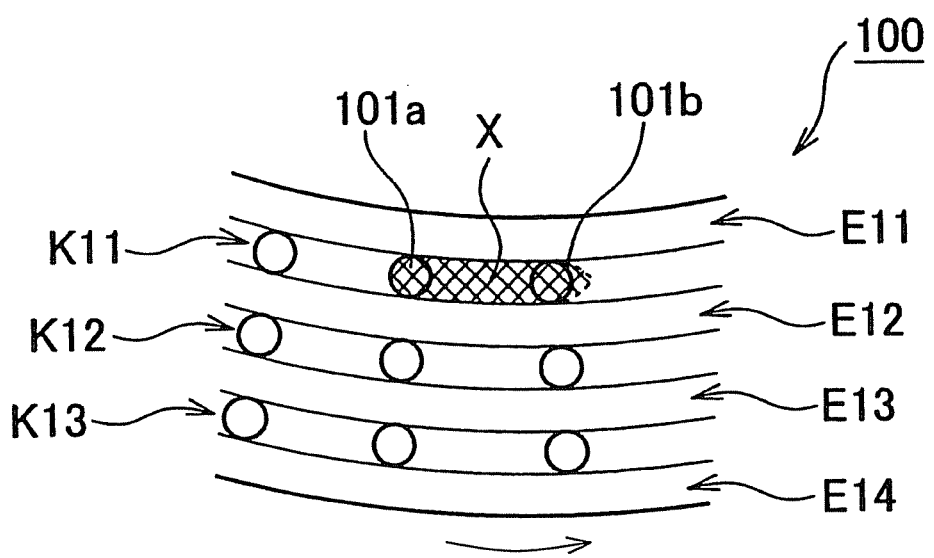
FIG. 5 is a plan view schematically illustrating the state of the sliding surface in the sliding component according to the first embodiment of the invention.

The mechanism that exerts the function of stably positioning the gas phase by the dimples 101 will be described with reference to FIGS. 4 and 5. The passage of the liquid through the gas phase is blocked when the gas phase is positioned. As a result, the liquid phase is also positioned. FIGS. 4 and 5 are plan views schematically illustrating a state of a sliding surface in the sliding component (first sliding component) of the first embodiment. In the pre-rotation state, the inside of the dimple 101 becomes the gas phase. The gas phase flows in a circumferential direction by the rotation to form the state illustrated in FIG. 4. The state illustrated in FIG. 5 is formed by the addition of the cavitation generated by the rotation.

The shape and the size of the dimple 101 (particularly, the shape of the edge portion) are set so as to satisfy specific conditions, and the dimples 101 are arrayed so as to satisfy specific conditions. Therefore, it was found that the gas phase was able to be positioned along the dimples 101. More specifically, as described above, the sliding surface becomes the mixed state of the gas phase and the liquid phase during the rotation, when the dimple does not exist. On the other hand, when the dimple 101 that has the acute angle exists in the edge portion provided along the opening end edge thereof, the edge portion acts on a gas-liquid interface as a geometric barrier to block the passage of the liquid on the dimple 101. As a result, the gas phase is consolidated on the dimple array, and the liquid phase is moved along the edge portion of the dimple and removed from the dimple array. Accordingly, it was found that the gas phase was able to be retained along the edge portion of the dimple array.

The mechanism will be described in detail. The mechanism is derived from the result of consideration based on the actual observation.

Figure 6:
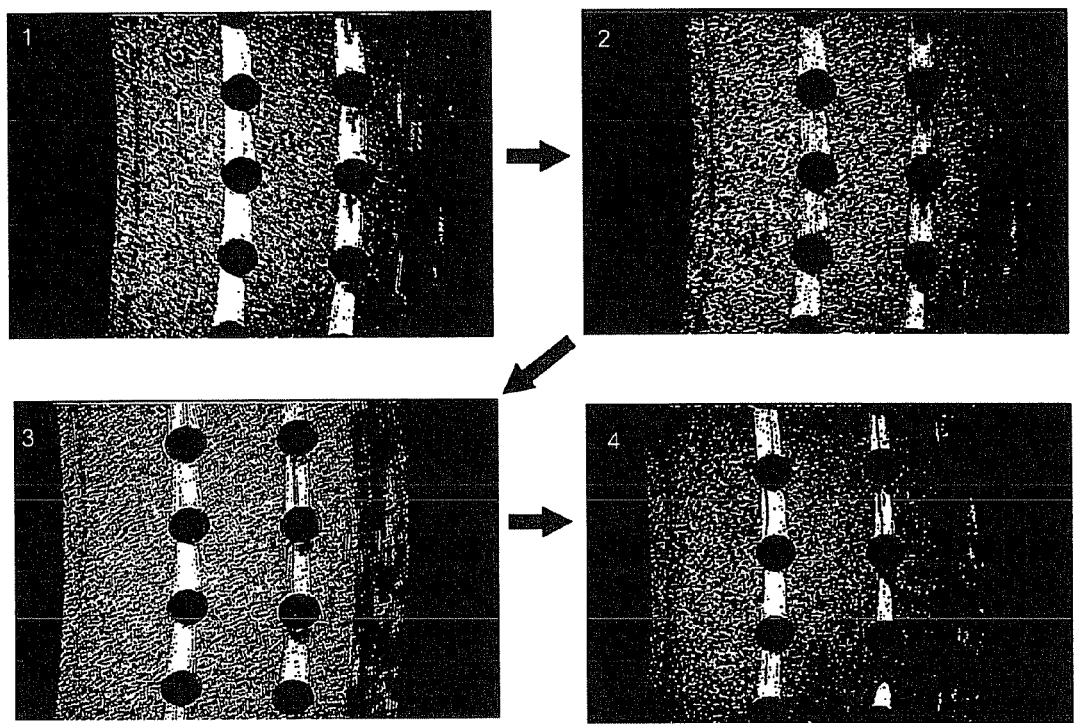
FIG. 6 is an enlarged view illustrating behavior of a liquid phase and a gas phase on the sliding surface in the sliding component according to the first embodiment of the invention.

When the dimples having the acute edge portion that acts as the geometric barrier are continuously arrayed in the circumferential direction, the gas phase is formed along the dimple array to divide the liquid film. FIG. 6 illustrates the behavior of the liquid phase and the gas phase on the sliding surface in the sliding component of the first embodiment. FIG. 6 illustrates the state on the actual sliding surface when the test is performed with the dimples having the depth of 50 μm and the diameter of 200 μm. The test is performed based on a table on an upper side of FIG. 9. In FIG. 6, the states of the sliding surfaces are illustrated in each time a predetermined time elapses in the ascending order of the numeric character on the upper left of FIG. 6. In FIG. 6, a white portion between the dimples (circle portions) corresponds to the gas phase. As illustrated in FIG. 6, as a result of the sliding surface observation, it was able to be confirmed that the gas phase and the liquid phase are stably formed in the sliding surface to suppress the radial movement of the liquid that is of the sealed fluid. This is attributed to the following fact. That is, as illustrated in FIG. 6, the liquid phase is met with resistance from the edge portion of the dimple, and the liquid phase is removed from the dimple array, thereby forming the gas phase on the dimple array. Finally, it was able to be confirmed that the gas phase and the liquid phase are stably retained by constraining the liquid phase between the dimple arrays retaining the gas phases.

As described above, because the liquid phase is met with resistance from the edge portion of the dimple and removed from the dimple array, a gaseous film F is formed along the edge portion of the dimple (see FIG. 4).

FIG. 5 schematically illustrates the state of the sliding surface in the first sliding component 100 when the second sliding component 200 rotates at a constant speed. An arrow in FIG. 5 indicates a rotation direction of the second sliding component 200.

As illustrated in FIG. 5, annular gas phases K11, K12, and K13 were formed along the dimples 101 arrayed on the virtual circumferences, and the annular liquid phases E11, E12, E13, and E14 were formed in portions except the annular gas phases K11, K12, and K13. It was able to be confirmed that the behavior of the gas phases K11, K12, and K13 and the liquid phases E11, E12, E13, and E14 were stabilized so as not to move in the radial direction.

From the observation result, it is believed that each dimple 101 has action that retains the gas phase under given conditions. It is believed that the dimples are arrayed such that a certain dimple exists in the region of the gaseous film F retained by another dimple, which allows the gas phase to be positioned along the dimples.

This will be described in detail based on two dimples 101a and 101b that are adjacent to each other in FIG. 5. The dimple 101a is located on an upstream side in the rotation direction of the second sliding component 200, and the dimple 101b is located on a downstream side. The dimples 101a and 101b are disposed such that the dimple 101b exists within a range X of the gaseous film formed along the edge portion of the upstream-side dimple 101a. Accordingly, the gas phase is formed so as to connect the dimples 101a and 101b.

The dimples 101 are arrayed at equal intervals on the virtual circumference having the center point at the rotation centers of the two components, which allows the annular gas phase to be formed along the dimples 101 to position the gas phase. Because the liquid phase is retained along the positioned gas phase, the liquid phase is also positioned.

<Advantage of First Embodiment>

According to the sliding component (first sliding component 100) of the first embodiment, the liquid phases E11, E12, E13, and E14 and gas phases K11, K12, and K13, which are formed so as to rotate about the rotation center of the two components (first sliding component 100 and second sliding component 200), are positioned in the sliding portions of the two components. Therefore, the positioned phases stably form the gas-liquid interface to exert the function of blocking the radial movement of the fluid. Accordingly, the liquid phase can be prevented from being eliminated in the sliding portion, and the film (lubricating film) is stably formed in the sliding surface with the liquid to suppress the sliding abrasion. In the first embodiment, the first sliding component 100 and the second sliding component 200 constitute the mechanical seal 10, which allows the suppression of the leakage of the sealed fluid.

<<Dimensions of Dimple>>

Figure 7:
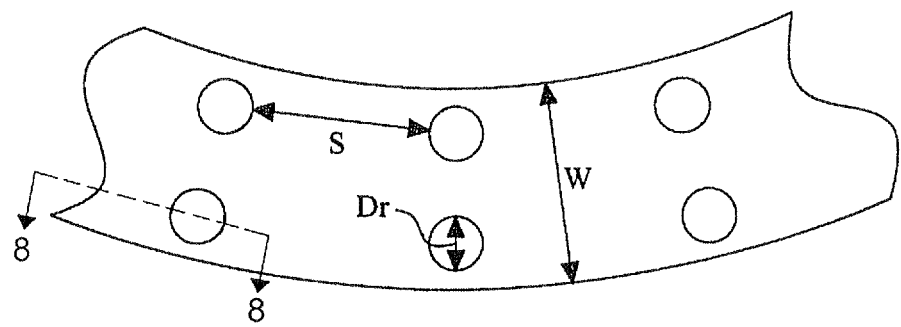
FIG. 7 is a view for explaining dimensions of each portion in the sliding component according to the first embodiment of the invention.

The setting of the dimple dimensions will be described with reference to FIGS. 7 and 8. In order to sufficiently exert the function, it is necessary to properly set the dimple dimensions. This point will be described below.

<<<Radial Dimensions>>>

It is assumed that W is a radial width of the sliding surface in the sliding component, and it is assumed that Dr is a radial width of the sliding surface in the dimple. It is assumed that n is the number of radially arrayed dimples provided in the sliding component (n=2 in the example of FIG. 7). At this point, Dr×n÷W may be set to 0.15 or more and 0.5 or less. This is because the necessity to secure the radial width to some extent in the dimple arises in order that the gas phase is formed so as to connect the dimples adjacent to each other in the circumferential direction. On the other hand, when a ratio of the radial width of the dimple to the radial width W of the sliding surface increases excessively, a load supporting region or a liquid phase retaining width decreases excessively. Therefore, the relationship of Dr×n÷W is set in the above-described range such that a ratio of the gas phase and the liquid phase (also corresponds to the load supporting region) becomes proper.

<<<Interval Between Dimples Adjacent to Each Other in the Circumferential Direction>>>

It is assumed that S is an interval between the dimples adjacent to each other in the circumferential direction. At this point, S÷Dr may be set to 0 or more and 10 or less. This is because the necessity to narrow the interval between the dimples adjacent to each other in the circumferential direction arises in order that the gas phase is formed so as to connect the dimples adjacent to each other in the circumferential direction. On the other hand, because there is no limitation to a lower limit of the interval between the dimples, the dimples may be in contact with each other. Therefore, the relationship of S÷Dr is set in the above-described range.

<<<Edge Portion Provided Along Opening End Edge of Dimple>>>

Figure 8:
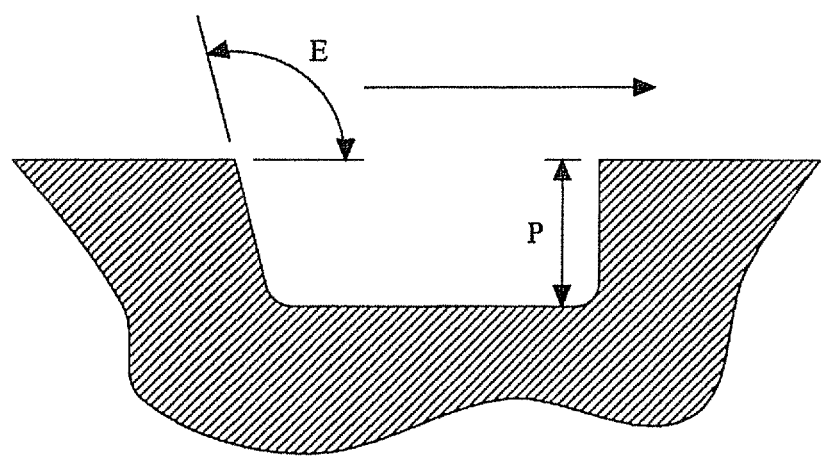
FIG. 8 is an enlarged cross-sectional view for explaining dimensions of a dimple in the sliding component of FIG. 7, taken along the line 8-8 of FIG. 7 according to the first embodiment of the invention.

As shown in FIG. 8, an angle E of the edge portion (the edge portion on the upstream side in the rotation direction of the sliding surface on the other side) provided along the opening end edge in the dimple may be set to 130° or less. The reason the angle E is set to 130° or less is that the necessity to sufficiently exert gas phase retaining capability arises because the geometric barrier action decreases with respect to the gas-liquid interface with increasing angle E in the edge portion.

<<<Depth of Dimple>>>

In FIG. 8 a depth P of the dimple may be set to 5 μm or more and 50 μm or less. There is no particular correlation of the depth of the dimple with the function of retaining the gas phase and the liquid phase. However, the upper limit of the depth of the dimple is properly set to about 50 μm because an amount of gas reserved in the dimple becomes excessive when the depth of the dimple increases excessively. When the dimples are formed through the laser processing, the lower limit of the depth of the dimple is properly set to about 5 μm in order to sufficiently secure the dimensional accuracy by the current laser processing technique.

<<Evaluation Test Results of Sliding Component of First Embodiment and Sliding Component of Comparative Example>>

Evaluation test results of the sliding component of the first embodiment and the sliding component of a comparative example will be described with reference to FIGS. 9 to 12.

In FIG. 9, upper-side two tables illustrate shape specifications of the end face and test conditions in the evaluation test in which a change in friction coefficient is measured while the state of the sliding surface is observed. More specifically, a SiC seal ring was used as the first sliding component 100 on the fixed side, an optical-flat transparent material was used as the second sliding component 200 on the rotation side. The change in friction coefficient was measured while the state of the sliding surface was observed through the second sliding component 200 made of the transparent material.

Figure 10:
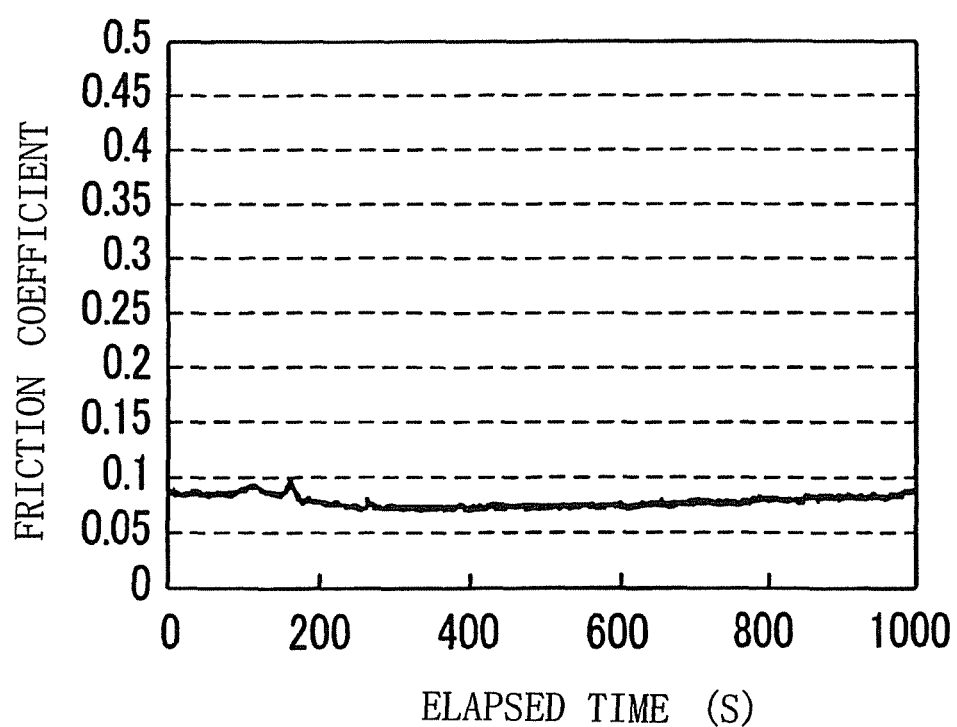
FIG. 10 is a graph illustrating an elapsed time and a change in friction coefficient in the sliding component according to the first embodiment of the invention.
Figure 11A:
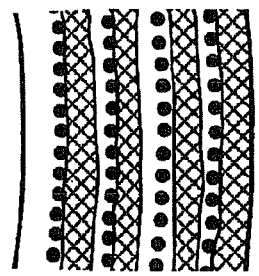
FIGS. 11A to 11D illustrate behavior of the liquid phase and the gas phase on the sliding surface in the sliding component according to the first embodiment of the invention.
Figure 11B:
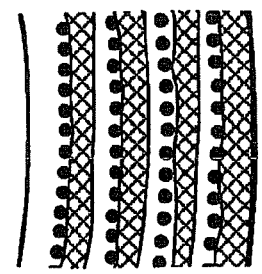
Figure 11C:
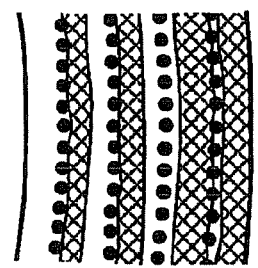
Figure 11D:
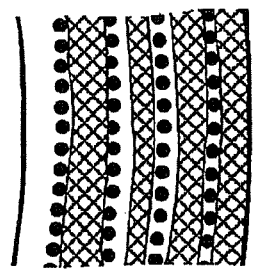

The test was performed using the first sliding component 100 of the first embodiment in which 360 dimples 101 were circumferentially arrayed in each of the four virtual circumferences. Each dimple 101 was formed into the circular shape with the depth of 50 μm and the diameter of 70 μm. The interval between the dimples 101 adjacent to each other in the rotation direction was set to 175 μm. The angle (angle formed between the surface and the side face of the dimple) in the edge portion provided along the opening end edge of the dimple 101 was set to 90°. FIG. 10 illustrates a temporal change in friction coefficient when the second sliding component 200 is rotated at 500 rpm using the first sliding component 100. FIG. 10 is a graph illustrating the elapsed time and the change in friction coefficient in the sliding component of the first embodiment.

As can be seen from FIG. 10, the friction coefficient is stabilized. FIGS. 11A to 11D schematically illustrate the behavior of the liquid phase and the gas phase on the sliding surface in the sliding component of the first embodiment. The state of the sliding surface is illustrated in each time a predetermined time elapses in the order of (A), (B), (C), and (D). In FIGS. 11A to 11D, the black circles indicate dimples, the meshed portions indicate liquid phases, and the white portions that are not meshed indicate gas phases. As illustrated in FIGS. 11A to 11D, as a result of the sliding surface observation, it was able to be confirmed that the gas phase and the liquid phase were stably formed in the sliding surface to suppress the radial movement of the liquid that is of the sealed fluid.

In FIG. 9, lower-side two tables illustrate the shape specifications of the end face and the test conditions in the test that evaluates the sealing performance. At this point, a SiC dense material was used as the second sliding component 200 on the rotation side. In the test, a leakage amount of the sealed fluid and a post-test abrasion amount of the first sliding component 100 were measured. The sealing performance evaluation test was performed to samples in which dimensions (parameters) of each portion are varied. FIG. 20 illustrates the test result. In the result of the table in FIG. 20, the sample having the large leakage amount or abrasion amount is indicated by the letter (NG) after the numerical value.

As can be seen from the table of FIG. 20, both the leakage amount and the abrasion amount became NG when Dr×n÷W was set to 0.1 (sample 1) and 0.7 (sample 6). The leakage amount became NG when S÷Dr was set to 15 (sample 8). Both the leakage amount and the abrasion amount became NG when the edge angle E was set to 150° (sample 5).

The same test was performed as a first comparative example using the first sliding component in which the dimple was not provided. The first sliding component of the first embodiment differs from the first sliding component of the first comparative example only in the presence or absence of the dimple.

Figure 12:
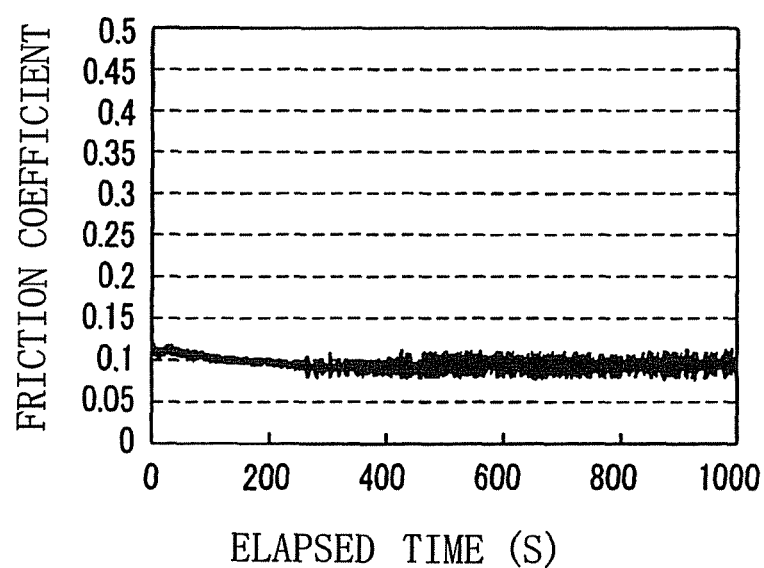
FIG. 12 is a graph illustrating the elapsed time and the change in friction coefficient in a sliding component according to a first comparative example.

FIG. 12 is a graph illustrating the elapsed time and the change in friction coefficient in the sliding component of the first comparative example. As can be seen from FIG. 12, the friction coefficient is not stable but unstable for the first comparative example. For the first comparative example, it can be confirmed that the behavior of the gas phase and the liquid phase transfer unstably (state expressing the unstable behavior similar to those of FIGS. 21A to 21D). For the first comparative example, it is believed that the behavior of the gas phase and the liquid phase are unstable, and the ratio of the width of the fluid lubricating film that is of the liquid phase varies with time, whereby the friction coefficient varies vibrationally.

As can be seen from the table in FIG. 20, both the leakage amount and the abrasion amount became NG when the dimples were not provided (sample 12).

Second Embodiment

FIGS. 13 to 17 illustrate a sliding component according to a second embodiment of the invention. In the configuration of the first embodiment, the dimples are disposed so as to be arrayed on the virtual circumferences. In the configuration of the second embodiment, the dimples are disposed so as to be arrayed on a virtual spiral. Because the configuration and the action except the disposition of the dimples are identical to those of the first embodiment, the description of the identical constituent will not be repeated as appropriate.

Figure 13:
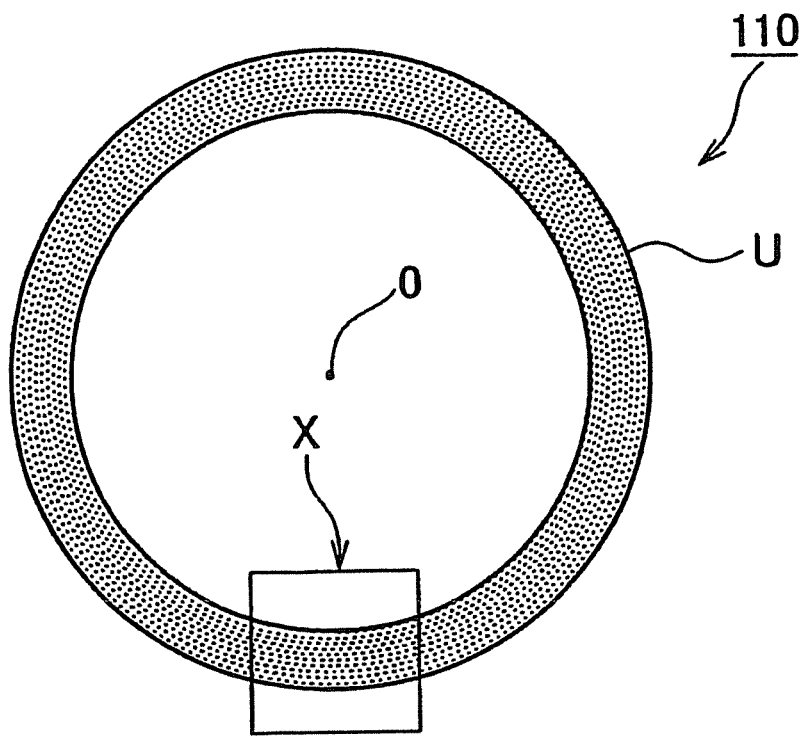
FIG. 13 is a plan view of a sliding component according to a second embodiment of the invention.
Figure 14:
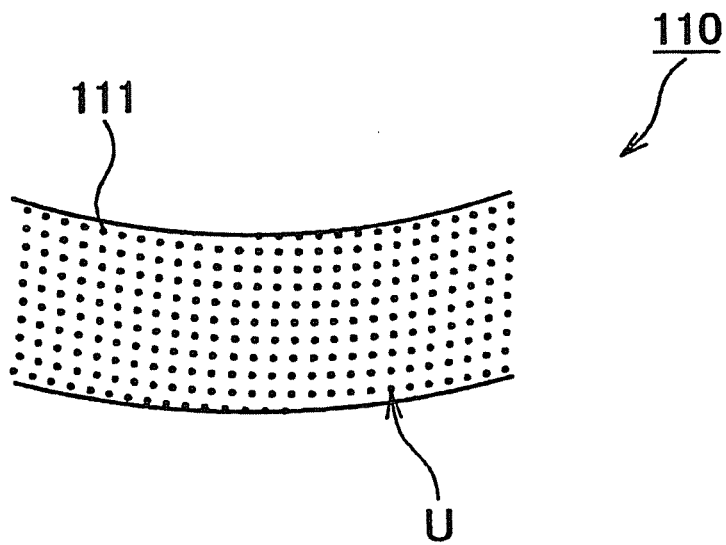
FIG. 14 is a partially enlarged view of the sliding component according to the second embodiment of the invention.
Figure 15:
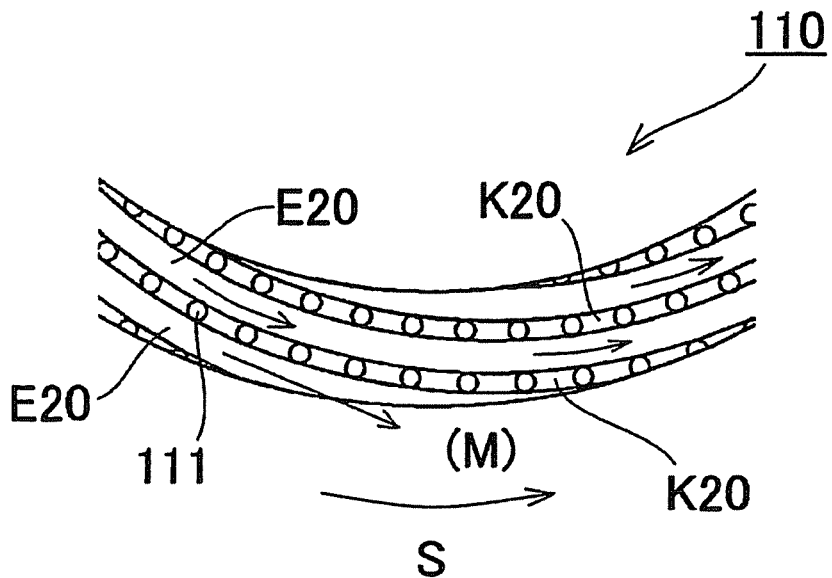
FIG. 15 is a plan view schematically illustrating a state of the sliding surface in the sliding component according to the second embodiment of the invention.

FIG. 13 is a plan view of the sliding component (first sliding component) of the second embodiment. FIG. 14 is a partially enlarged view of the sliding component (first sliding component) of the second embodiment. FIG. 14 is an enlarged view of an X portion in FIG. 13. FIG. 15 is a plan view schematically illustrating the state of the sliding surface in the sliding component (first sliding component) of the second embodiment.

In the second embodiment, a plurality of dimples 111 is provided in a sliding surface of a first sliding component 110. In the second embodiment, the dimples 111 are disposed so as to be arrayed on a virtual spiral U that revolves in the rotation direction of the two components.

That is, as described above, it is believed that the action that retains the gas phase along the edge portion provided along the opening end edge of the dimple is possessed under given conditions. The film that is formed along the edge provided along the opening end edge of the dimple has the width corresponding to the diameter of the dimple. Accordingly, in the two dimples adjacent to each other in the rotation direction, it was found that the gas phase was formed so as to connect the dimples when the dimple on the downstream side fell within the range of the film retained by the dimple on the upstream side even if the dimples did not exist on the virtual circumference.

Figure 17:
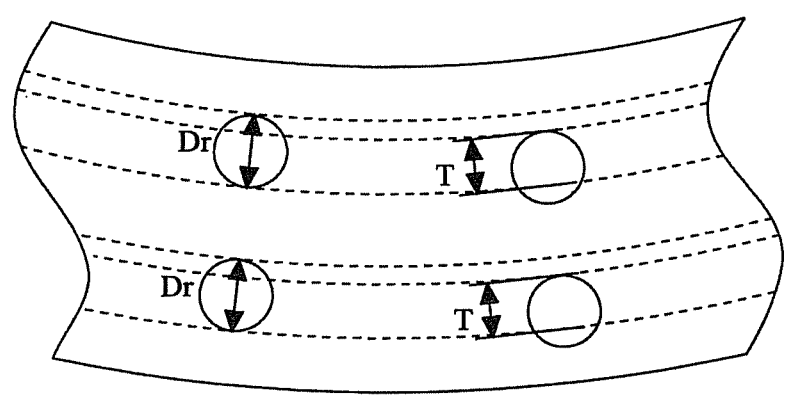
FIG. 17 is a view for explaining dimensions of each portion in the sliding component according to the second embodiment of the invention.

This point will be described in detail with reference to FIG. 17. As illustrated in FIG. 17, it is assumed that T is a radial width in a region (overlapping region) where the dimples adjacent to each other in the circumferential direction circumferentially overlap each other. At this point, T÷Dr may be set to 0.5 or more and 1 or less. This is because the gas phase is hardly formed so as to connect the dimples adjacent to each other in the circumferential direction as the width T decreases. As illustrated in the table of FIG. 20, the leakage amount became NG when T÷Dr was set to 0.3 (sample 10).

The reason the dimple is formed into the shape having the acute angle in the edge portion provided along the opening end edge is already described in the first embodiment.

The dimples 111 are arrayed on the virtual spiral U, which allows a spiral gas phase K20 and a liquid phase E20 to be positioned along the dimples 111 (see FIG. 15).

Accordingly, similarly to the first embodiment, the gas phase and the liquid phase can stably be formed. The positioned gas phase and liquid phase stably form the continuous gas-liquid interface. Therefore, the gas phase and the liquid phase exert the function of blocking the fluid movement (movement in which the gas passes through the liquid phase and movement in which the liquid passes through the gas phase). Accordingly, the liquid phase can be prevented from being eliminated in the sliding portion, and the film (lubricating film) is stably formed in the sliding surface with the liquid, which allows the suppression of the sliding abrasion. In the second embodiment, the first sliding component 110 is a constituent of the mechanical seal, and the leakage of the sealed fluid can be suppressed.

In the second embodiment, it was found that a pumping action in which the liquid that was of the sealed fluid moves along the positioned gas phase was generated. In FIG. 15, an arrow S indicates the rotation direction of the second sliding component 200, and it was found that the liquid in the liquid phase E20 moved so as to be orientated toward the rotation direction.

Accordingly, a vortex orientation of the virtual spiral on which the dimples 111 are arrayed is set based on the relative rotation direction of the second sliding component 200 and based on whether the region where the sealed fluid is sealed is located on the inner circumference side or the outer circumference side, which allows the sealed fluid to be returned to the sealed region side. For example, for the example in FIG. 15, the outer circumference side is the sealed region, and the liquid M that is of the sealed fluid can be returned to the sealed region by the pumping action.

Figure 16:
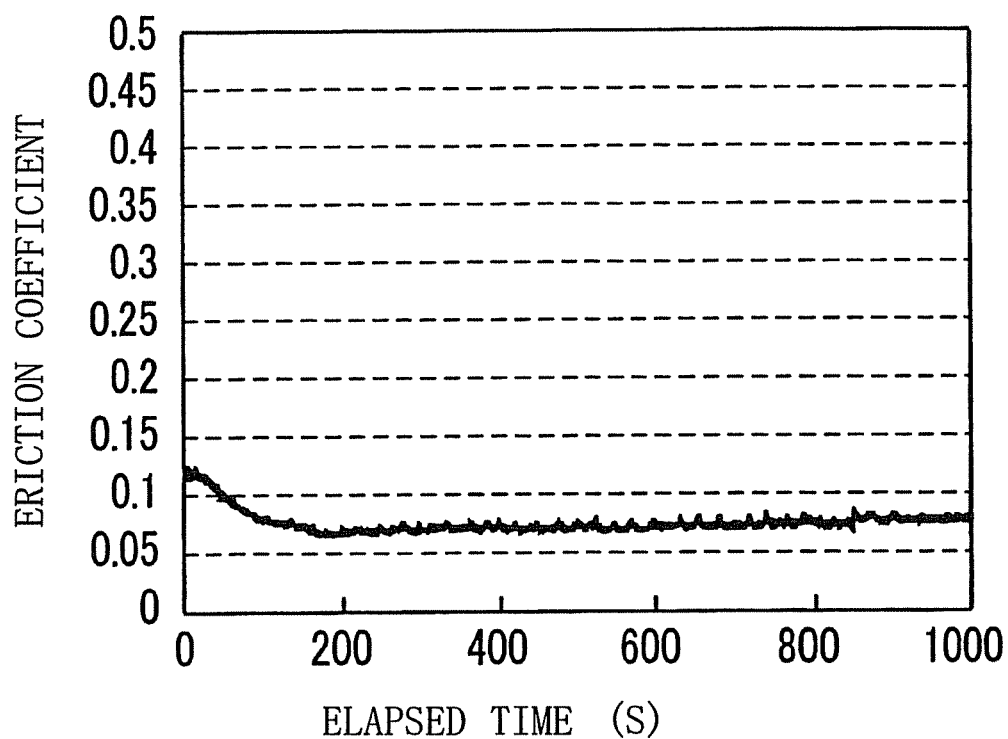
FIG. 16 is a graph illustrating the elapsed time and the change in friction coefficient in the sliding component according to the second embodiment of the invention.

In the first sliding component 110 of the second embodiment, the test (test identical to that of the table illustrated in FIG. 9 except that the number of revolutions in the table on the upper right was set to not 500 rpm but 300 rpm) similar to that of the first embodiment was performed. As the first sliding component 110 of the second embodiment, 360 dimples 111 are arrayed in one turn of the virtual spiral, and the eight virtual spirals are arrayed. Each dimple 111 was formed into the circular shape with the depth of 50 μm and the diameter of 70 μm. The interval between the dimples 111 adjacent to each other in the rotation direction was set to 175 μm. The angle (angle formed between the surface and the side face of the dimple) in the edge portion of the dimple 101 was set to 90°. FIG. 16 illustrates a temporal change in friction coefficient when the second sliding component 200 is rotated at 300 rpm using the first sliding component 110. FIG. 16 is a graph illustrating the elapsed time and the change in friction coefficient in the sliding component of the second embodiment.

As can be seen from FIG. 16, the friction coefficient is stabilized. As a result of the sliding surface observation, it was able to be confirmed that the gas phase and the liquid phase were stably formed in the sliding surface. In the second embodiment, it was able to be confirmed that the liquid moved along the virtual spiral in which the dimples 111 were arrayed. It was able to be confirmed that the liquid movement direction varied by changing the rotation direction.

Third Embodiment and Fourth Embodiment

As described above, the dimples of the first and second embodiments do not have load support capability because the gas phase is formed on the dimple array. Therefore, the load supporting region is reduced in the sliding surface as the number of dimples increases. A surface pressure increases when the number of dimples increases excessively. As a result, a limit at which the lubricating film (film formed with the liquid) can be retained is lowered. Accordingly, the number of dimples is desirably determined such that the lubricating film is stably formed by positioning the gas phase and the liquid phase, and the number of dimples is desirably minimized within the range in which the leakage of the sealed fluid can be prevented such that the load supporting region is secured.

Figure 18:
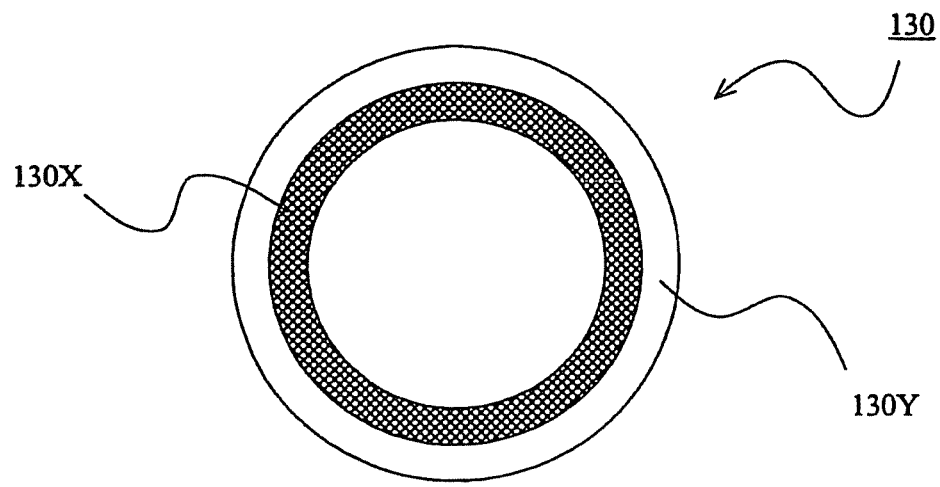
FIG. 18 is a plan view of a sliding component according to a third embodiment of the invention.
Figure 19:
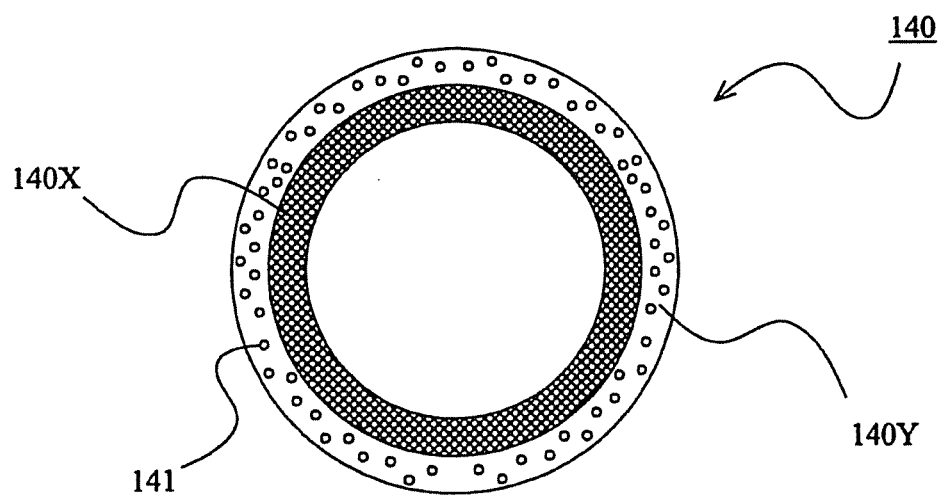
FIG. 19 is a plan view of a sliding component according to a fourth embodiment of the invention.
Figure 21A:
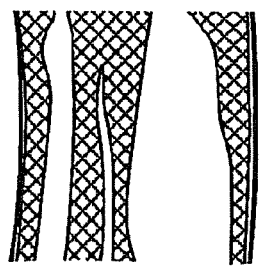
FIGS. 21A to 21D illustrate an example of behavior of the liquid phase and the gas phase that are produced between sliding surfaces of two components that rotate relatively at a constant speed.
Figure 21B:
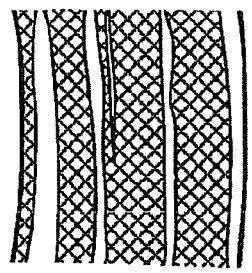
Figure 21C:
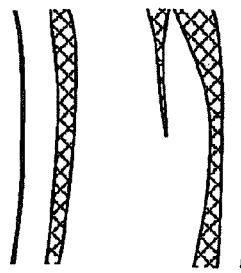
Figure 21D:
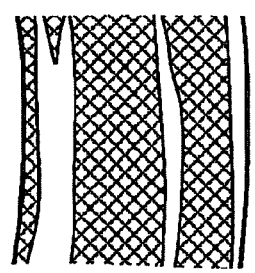
Figure 22:
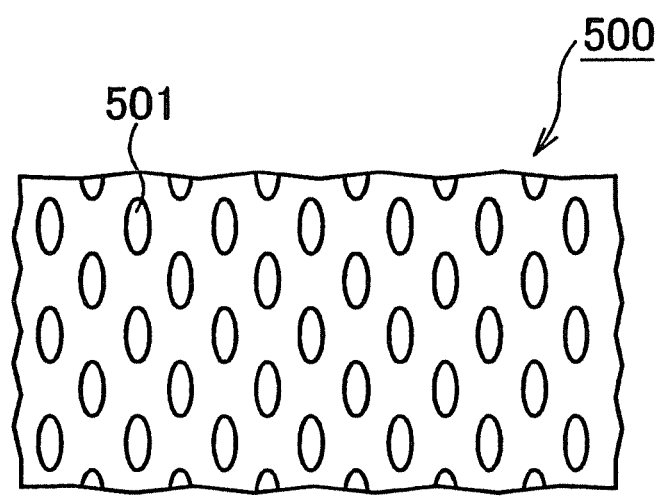
FIG. 22 is a partially enlarged view of a sliding component according to a conventional example.

For example, as illustrated in FIGS. 18 and 19, it is preferable that the region where the dimples retaining the gas phase are arrayed is limited to a given range similarly to the first and second embodiments, and the load supporting region or the region where the dimples having the hydrodynamic pressure generating action are arrayed are located in other regions. At this point, in the inner circumference side and the outer circumference side of the sliding surface, the region where the dimples retaining the gas phase are arrayed is located on the opposite side to the side filled with the liquid and limited to the range of ⅔ or less of the radial width of the sliding surface, thereby obtaining the load support capability satisfying quality. In the third and fourth embodiments, because the outer circumference side is filled with the liquid, the region where the dimples retaining the gas phase are arrayed is provided on the inner circumference side. As to the radial dimensional relationship (Dr×n÷W is set to 0.15 or more and 0.5 or less) described in the first embodiment, the radial width of the region where the dimples retaining the gas phase are arrayed corresponds to W in the third and fourth embodiments.

FIG. 18 is a plan view of a sliding component (first sliding component) according to a third embodiment of the invention.

In the first and second embodiments, the dimple has the acute angle in the edge portion provided along the opening end edge thereof, and the dimples retaining the gas phase are arrayed in the substantially whole region of the sliding surface. On the other hand, for a first sliding component 130 of the third embodiment, the dimples retaining the gas phase are arrayed only in a region 130X (meshed region) that is limited to the inner circumference side. The dispositions of the dimples of the first and second embodiments may be applied to the third embodiment.

In the first sliding component 130 of the third embodiment, a region 130Y on the outer circumference side is formed with a smooth surface (surface in which irregularity such as the dimple does not exist). Therefore, because the load can be supported by the region 130Y on the outer circumference side, the sliding state can be stabilized.

FIG. 19 is a plan view of a sliding component (first sliding component) according to a fourth embodiment of the invention.

For a first sliding component 140 of the fourth embodiment, similarly to the third embodiment, the dimples retaining the gas phase are arrayed only in a region 140X (meshed region) that is limited to the inner circumference, side. The dispositions of the dimples of the first and second embodiments may be applied to the fourth embodiment.

In the first sliding component 140 of the fourth embodiment, a plurality of dimples 141 that exerts the hydrodynamic pressure generating action is provided in a region 140Y on the outer circumference side. Therefore, the reduction of the frictional force can further be achieved while the load is supported by the region 140Y on the outer circumference side.

This application claims the benefit of Japanese Patent Application No. 2010-048035, filed on Mar. 4, 2010, which is hereby incorporated by reference herein in its entirety.

What is claimed is:
1. A mechanical seal for sealing a liquid comprising:
a first sliding component having an annular first sliding surface; and a second sliding component configured to rotate relative to the first sliding component, the second sliding component having an annular second sliding surface that slides on the first sliding surface, wherein a liquid phase made of the liquid and a gas phase made of gas generated due to cavitation in the liquid are formed between the first and the second sliding surfaces during relative rotation of the first and the second sliding components, one of the first and the second sliding, surfaces is provided with a plurality of dimples, each dimple having a shape that is circumferentially symmetric on each side of a line that radially bisects the dimple in a plan view, and, a geometric barrier configured to block a flow of the liquid flowing towards the each dimple and form a gaseous film extending in a direction of the flow during the relative rotation of the first and the second sliding components, the geometric barrier being an upstream portion of an opening edge of the each dimple, the upstream portion being formed into a shape having an angle of 130 degrees or less between the sliding surface and a side face of the each dimple, wherein every two consecutive dimples of the plurality of dimples in the direction of the flow are arranged next to each other in the direction of the flow and within the gaseous film formed by one dimple on the upstream side, the plurality of dimples is arrayed along an entire circumference of the one of the first and the second sliding surfaces, the plurality of dimples is arrayed on each of a plurality of virtual circumferences within the entire circumference of one of the first and second sliding surfaces having center points at a rotation center of the first and second sliding components, the plurality of virtual circumferences having different diameters, whereby a plurality of dimples arrayed on a smaller one of two consecutive virtual circumferences and a plurality of dimples arrayed on a larger one of the two consecutive virtual circumferences are arrayed so as to leave a space between a virtual circle defined by outermost points of the plurality of dimples arrayed on the smaller one of the two consecutive virtual circumferences and another virtual circle defined by innermost points of the plurality of dimples arrayed on the larger one of the two consecutive virtual circumferences, and the mechanical seal satisfies parameters (1) to (3):

$$0.15 \leq Dr \times n/W \leq 0.5 \quad (1)$$

$$0 \leq S/Dr \leq 10 \quad (2)$$

$$0.5 \leq T/Dr \leq 1 \quad (3)$$

wherein $Dr$ is a radial width of the each dimple, $W$ is a radial width of the one of the first and second sliding surfaces, $n$ is the number of radially arrayed dimples in the radial width of the one of the first and second sliding surfaces, $S$ is an interval between two dimples adjacent to each other in the circumferential direction and $T$ is a radial width of two dimples adjacent to each other in the circumferential direction that are circumferentially aligned with each other.

2. The mechanical seal according to claim 1, wherein, in an inner circumference side and an outer circumference side of the one of the first and second sliding surfaces, the plurality of dimples is provided on the side opposite to the side filled with the liquid and within a range of ⅔ of a radial width of the one of the first and second sliding surfaces.

3. The mechanical seal according to claim 1, wherein the two dimples next to each other in the direction of the flow are arranged so that radial widths of the two dimples are circumferentially aligned with each other.

4. The mechanical seal according to claim 1, wherein the opening edge of the each dimple is a closed opening edge within the one of the first and the second sliding surfaces.

5. The mechanical seal according to claim 1, wherein a depth of the dimple is set to 5 μm or more and 50 μm or less.

6. The mechanical seal according to claim 1, wherein the least one annular liquid phase is formed in between each of the plurality of annular gas phases.

7. The mechanical seal according to claim 1, wherein the upstream portion of the opening edge of each radially adjacent dimple arrayed on the plurality of virtual circumferences is on an angled line to a circumferential direction in a plan view, so as to remove the flow of liquid to radially inside and radially outside of the dimple.

* * * * *